United States Patent
Fan et al.

(10) Patent No.: US 11,053,387 B2
(45) Date of Patent: Jul. 6, 2021

(54) ONE-STEP SPUN COMPOSITE DTY AND PREPARATION METHOD THEREOF

(71) Applicant: JIANGSU HENGLI CHEMICAL FIBRE CO., LTD., Wujiang (CN)

(72) Inventors: Hongwei Fan, Wujiang (CN); Guanfan Jin, Wujiang (CN); Ming Chen, Wujiang (CN); Huailin Ren, Wujiang (CN); Yongfeng Wang, Wujiang (CN); Xiangming Wang, Wujiang (CN)

(73) Assignee: JIANGSU HENGLI CHEMICAL FIBRE CO., LTD., Wujiang (CN)

(*) Notice: Subject to any disclaimer, the term of this patent is extended or adjusted under 35 U.S.C. 154(b) by 0 days.

(21) Appl. No.: 16/641,255

(22) PCT Filed: Jul. 27, 2018

(86) PCT No.: PCT/CN2018/097501
§ 371 (c)(1),
(2) Date: Feb. 24, 2020

(87) PCT Pub. No.: WO2019/114277
PCT Pub. Date: Jun. 20, 2019

(65) Prior Publication Data
US 2020/0190319 A1 Jun. 18, 2020

(30) Foreign Application Priority Data

Dec. 14, 2017 (CN) .......................... 201711340288.7

(51) Int. Cl.
*C08L 67/06* (2006.01)
*C08L 67/02* (2006.01)
*D01F 6/84* (2006.01)

(52) U.S. Cl.
CPC ............ *C08L 67/06* (2013.01); *C08L 67/02* (2013.01); *D01F 6/84* (2013.01); *C08L 2203/12* (2013.01); *C08L 2205/025* (2013.01)

(58) Field of Classification Search
CPC .... D01F 6/84; D01F 6/92; D01F 8/14; D06N 3/0036; D06M 2101/02; D01D 5/096; D02J 13/00; C08L 2205/025; C08L 67/02; C08L 67/06; C08L 2203/12; C08G 63/78; C08G 63/183; C08G 63/80; B32B 27/36; B33Y 70/00; D10B 2331/04; Y10S 8/922
USPC ............ 428/401, 364, 395, 296.7, 482, 373; 524/604; 528/302, 308.6, 271; 264/210.8, 211.4; 8/922
See application file for complete search history.

(56) References Cited

FOREIGN PATENT DOCUMENTS

| | | |
|---|---|---|
| CN | 104141178 A | 11/2014 |
| CN | 105155034 A | 12/2015 |
| CN | 106283250 A | 1/2017 |
| CN | 106350889 A | 1/2017 |
| CN | 106381558 A | 2/2017 |
| CN | 108048939 A | 5/2018 |

*Primary Examiner* — Camie S Thompson
(74) *Attorney, Agent, or Firm* — Bayramoglu Law Offices LLC

(57) ABSTRACT

A one-step spun composite DTY and preparation method thereof are provided. The bi-profiled fiber is manufactured with two types of modified polyester of different viscosities through the steps of melting, melt metering, composite extruding, cooling, oiling, drawing, heat setting and winding. Wherein those two modified polyesters have a molecular structure including terephthalic acid segments, ethylene glycol segments and branched diol segments, and the branched diol has a structural formula of

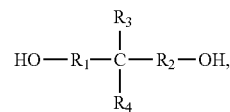

here $R_1$ and $R_2$ are separately selected from the linear alkylene with 1-3 carbon atoms, $R_3$ from the alkyl with 1-5 carbon atoms, and $R_4$ from the alkyl with 2-5 carbon atoms. The obtained one-step spun composite DTY has an elastic shrinkage rate of no less than 35%. The method presented in this invention is involved in a simple and reasonable technological process for wide application range.

20 Claims, No Drawings

ONE-STEP SPUN COMPOSITE DTY AND PREPARATION METHOD THEREOF

CROSS REFERENCE TO THE RELATED APPLICATIONS

This application is the national phase entry of International Application No. PCT/CN2018/097501, filed on Jul. 27, 2018, which is based upon and claims priority to Chinese Patent Application No. 201711340288.7, filed on Dec. 14, 2017, the entire contents of which are incorporated herein by reference.

TECHNICAL FIELD

The present invention belongs to the field of fiber manufacture, and more particularly, relates to a type of one-step spun composite draw texturing yarn (DTY) and preparing method thereof.

BACKGROUND

The production of polyethylene terephthalate (PET) fiber has grown rapidly and topped out in world's synthetic fibers since its inception. Because of its excellent properties such as high broken strength, high elastic modulus, suitable resilience, excellent heat setting performance, strong resistance to heat, light, acid, alkali and corrosion, as well as the advantages of wrinkle resistance and stiffness of the involved fabrics, PET fiber has been widely used in the fields of clothing and home textile.

However, during the polycondensation process, the generation of linear PET polymer will also be accompanied by the linear or cyclic oligomers if the oxidative degradation is initiated by high temperature. Cyclic oligomers are those formed from the retraction and cyclization of intermediates during the condensation stage, among which more than 70% are found to be cyclic trimers. Being easy to aggregate and crystallize, stable to heat and chemical, cyclic trimers will affect the processing of PET fiber through (1) blocking the spinning pack to reduce the service life of filtering components, (2) subsiding and being deposited on the heating roller during the fiber thermal setting to increase the friction and the heating unevenness, (3) being the aggregation center of dyes to cause color stains or color specks in the surface of fiber and furtherly degrade the feel and shade of PET fabrics, or subsiding in pipelines and valves and blocking the dyeing flow to reduce the repeatability and evenness of fiber dyeing, or (4) adhering to the fiber surface and causing difficulty in yarn winding so as to result in yarn broken and unevenness, finally degrading the quality of fiber products.

PET DTY and Nylon DTY are the two most common stretch yarn varieties. The former is of relatively low elasticity and suitable for making knitted outerwear with soft handle, considerable flexibility, dimensional stability, wrinkle resistance, wool feeling and air permeability, whereas the latter is of good extensibility and elasticity and suitable for making knitwear such as socks, underwear, sportswear and gloves. Moreover, composite fibers are those desired to combine the both fibers to obtain the best performance.

As a matter of fact, how to prepare the one-step spun composite DTY with high elasticity and dimensional stability so as to significantly improve the quality of industrial yarn, has become an urgent problem

SUMMARY

A primary object of the present invention is to provide one kind of one-step spun composite DTY and preparing method thereof so as to overcome the problems such as poor heat setting effect, weak dyeability, dyeing unevenness and color stain existed in current PET fiber production.

Another object of the present invention is to provide one kind of one-step spun composite DTY, wherein the PET DTY possesses a fairly low content of oligomer without performance loss.

Another object of the present invention is to provide a method for preparing one-step spun composite DTY, wherein the branched diol is incorporated in PET so as to reduce the content of oligomer generated in side reaction and enhance the stability of PET producing.

Accordingly, to achieve above mentioned objects, the present invention provides a technological scheme for one-step spun composite DTY in which the monofilament is composed of two modified polyester with different viscosities, wherein each modified polyester has a molecular chain structure including terephthalic acid segments, ethylene glycol segments and branched diol segments, and herein said branched diol has a structural formula of

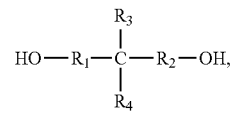

in which $R_1$ and $R_2$ are separately selected from the linear alkylene with 1-3 carbon atoms, $R_3$ from the alkyl with 1-5 carbon atoms, and $R_4$ from the alky with 2-5 carbon atoms. The purpose of introducing branch or long carbon chain into diol is to reduce the electronegativity of the alkoxy group. The small number of carbon atoms would just affect little on the electronegativity of the alkoxy group and have no significance in reducing the generation of cyclic oligomers, whereas the large number of carbon atoms would cause intermolecular entanglement and influence the distribution of molecular weight.

Herein said one-step spun composite DTY has an elastic shrinkage rate of no less than 35%.

As a preferred technology program, for the on-step spun composite DTY mentioned above, wherein the intrinsic viscosity ratio of two modified polyesters is 0.55-0.70:1.00-1.20, and higher one is 1.00-1.20 dL/g. The intrinsic viscosity ratio determines the elastic shrinkage of fiber, and the ratio range presented above has been optimized for the best elastic effect.

For the on-step spun composite DTY mentioned above, wherein the PET DTY has a fineness of 150-300 dtex, a linear density coefficient of variation (CV) of less than or equal to 1.00%, a breaking strength of greater than or equal to 2.2 cN/dtex, a breaking elongation of 37.2±4.0%, a breaking strength CV of less than or equal to 5.0%, a breaking elongation CV of less than or equal to 10.0% and a boiling water shrinkage of 9.5±0.5%.

For the on-step spun composite DTY, wherein the two modified polyesters with different viscosities have a cyclic oligomer content of less than or equal to 0.6 wt %, showing a remarkable subduction relative to 1.5-2.1 wt % of cyclic oligomer in the polyester prepared by the prior technology;

herein said modified polyester of low viscosity has a number average molecular weight of 17000-22000 and a molecular weight distribution index of 1.8-2.2;

herein said modified polyester of high viscosity has a number average molecular weight of 25000-30000 and a molecular weight distribution index of 1.8-2.2;

herein said two modified polyesters have a branched diol segment content of 3-5 mol % respect to terephthalic acid segments, which is beneficial to maintaining the excellent performance of the polyester itself;

herein said branched diol can be one of following compounds: 2-ethyl-2-methyl-1,3-propanediol, 2,2-diethyl-1,3-propanediol, 2-butyl-2-ethyl-1,3-propanediol, 3,3-diethyl-1,5-penpentadiol, 4,4-diethyl-1,7-heptanediol, 4,4-bis(1-methyl ethyl)-1,7-heptanediol, 3,3-dipropyl-1,5-pentanediol, 4,4-dipropyl-1,7-heptanediol, 4-methyl-4-(1,1-dimethyl ethyl)-1,7-heptanediol, 3-methyl-3-amyl-1,6-hexanediol or 3,3-dipropyl-1,5-pentanediol.

For the one-step spun composite DTY mentioned above, wherein the modified polyester of low viscosity is prepared through the steps as follows:

(1) Esterification;

Firstly, terephthalic acid, ethylene glycol and the branched diol are mixed into a slurry, then the esterification is carried out under the pressure of nitrogen after adding catalyst, extinction agent and stabilizer, wherein the pressure range from atmospheric pressure to 0.3 MPa while reaction temperature is 250-260° C., and the end point of esterification is chosen as the moment when the elimination of water reach 90% of the theoretical value;

(2) Polycondensation;

After the esterification hereinabove, the polycondensation is performed under negative pressure, which includes two successive stages, i.e., a) coarse vacuum stage, wherein the pressure is smoothly reduced from the normal value to less than 500 Pa within 30-50 min, and the reaction temperature is 260-270° C. while reaction time is 30-50 min, b) fine vacuum stage, wherein the pressure is furtherly reduced to less than 100 Pa, and the reaction temperature is 275-285° C. while reaction time is 50-90 min;

The obtained modified polyester of low viscosity will undergo an extra solid state polycondensation to produce the polyester of high viscosity.

For the one-step spun composite DTY mentioned above, in step (1) the molar ration of terephthalic acid, ethylene glycol and the branched diol is 1:1.2-2.0:0.03-0.06, and an amount of the catalyst is 0.01-0.05% by weight of the terephthalic acid, an amount of the extinction agent is 0.20-0.25% by weight of the terephthalic acid and an amount of the stabilizer is 0.01-0.05% by weight of the terephthalic acid;

wherein the catalyst is one of antimony trioxide, antimony glycol or antimony acetate, the extinction agent is titanium dioxide, and the stabilizer is one of triphenyl phosphate, trimethyl phosphate or trimethyl phosphite.

Additionally, in the present invention a method for preparing the one-step spun composite DTY mentioned above is also provided, generally including the steps of melting, melt metering, composite extruding, cooling, oiling, drawing, heat setting and winding;

As a preferred technology program, for the preparing method mentioned above, wherein the weight ration of polyester of high viscosity and polyester of low viscosity is 0.7-1.0:0.7-1.0.

For the preparing method mentioned above, the spinning technologies for the one-step spun composite DTY could be chosen as

| | |
|---|---|
| Spinning temperature | 280-290° C., |
| Cooling temperature | 20-25° C., |
| Interlacing pressure | 0.20-0.30 MPa, |
| Speed of godet roller 1 | 2200-2600 m/min, |
| Temperature of godet roller 1 | 75-85° C., |
| Speed of godet roller 2 | 3600-3900 m/min, |
| Temperature of godet roller 2 | 135-165° C., |
| Winding speed | 3580-3840 m/min, |
| Initial spinning pack pressure | 120 bar, |
| Spinning pack pressure rising ΔP | ≤0.6 bar/day, |
| Spinning pack life cycle | ≥60 days. |

The mechanism of this invention could be described as follows:

In organic compounds, the angle between two chemical bonds formed between intramolecular atoms, called bond angle and usually expressed in degrees, is affected by the electronegativity of central atoms and coordination atoms. When the electronegativity of the coordination atoms bonded with the central atom increases, i.e., the electron absorption ability of the coordination atoms increases, the electron pairs will move toward the coordination atom whereas far away from the central atom. Therefore, the chemical bonds will move closely with each other due to the reduction of repulsion force and the bond angle will decrease. On the contrary, when the electronegativity of coordination atoms decreases, namely, their donor ability increases, the electron pairs will move close to the central atom, hence the increase of repulsion force will drive the chemical bonds away from each other and the bond angle will also increase.

According to Pauling's electronegativity scale, the electronegativity of C, H and O atom is 2.55, 2.20 and 3.44, respectively. Furthermore, on the basis of valence electron energy balance theory, the electronegativity of an atom group can be calculated through the formula of $$\chi_{ve}(G) = \frac{\Sigma\, n_i \chi_i N_{ve,i}}{\Sigma\, n_i N_{ve,i}},$$

in which $\chi_i$ is the electronegativity of neutral atom i before bonding, $N_{ve,i}$ is the number of valence electrons in atom i, and $n_i$ is the number of atom i in molecule. The main steps for calculating the electronegativity of a complex atom group are as follows: a) calculating the electronegativity of simple group, b) treating the simple group as a quasi-atom and recalculating the electronegativity of the assembly of quasi-atoms, c) iterating the above calculations. It should be noted that in calculating the electronegativity of quasi-atoms, the unbounded valence electrons in the base atoms (e.g., the base atom of group —OH is O atom) should be regarded as the valence electrons of quasi-atoms.

During the esterification of terephthalic acid with diol, atom C released from the broken C—O bond of carboxyl group in terephthalic acid will combine with the atom O of hydroxyl group in the diol to form a new C—O bond in the ester group. If the angle between the bond C—C(one C belongs to the ester group and the other C to the benzene ring) and the newly formed bond C—O is marked as a, the change of the bond angle α will affect the cyclization reaction. Specifically, the cyclization will be easy if a is less than 109°, whereas the cyclizing probability will decrease when a becomes lager. In the present invention, the branched diol with a formula of

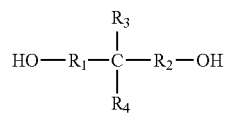

is incorporated in the polymerization, in which in which $R_1$ and $R_2$ are separately selected from the linear alkylene with 1-3 carbon atoms, $R_3$ from the alkyl with 1-5 carbon atoms, and $R_4$ from the alky with 2-5 carbon atoms. The alkoxyl part of that diol possess a weakened electronegativity because of the introduction of branch and long alkyl chain. It could been found from the calculation that when linking with carbonyl group, the electronegativity of alkoxyl part in the branched diol is 2.59-2.79 whereas the value is 3.04 for the —$OCH_2CH_2$— part in ethylene glycol, which means the electron donation ability of alkoxyl group in branched diol will be stronger than that in ethylene glycol. Therefore, a bond angle c lager than 109° will be formed when branched diols are introduced into the esterification reaction, which can reduce the generation of cyclic oligomers. The low cyclic oligomer content not only helps to reduce the phenomenon of yarn broken wires and yarn unevenness, but also helps to reduce the impact on the fiber mechanical properties such as the breaking strength and elongation at break, so as to improve the quality of fiber products.

In conclusion, the present invention provides
(4) a type of one-step spun composite DTY with the advantages of high elasticity, high dimensional stability and appreciable extensibility, etc.;
(5) the preparing method thereof, which is simple and reasonable for wide application range;
(6) the preparing method thereof, in which the branched diol has been incorporated to change the bond angles of polyester and then reduce the cyclic oligomer produced in the side reaction of polymerization.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

Example 1

A method for preparing the one-step spun composite DTY, comprising the technological process of:

(1) Preparation of Modified Polyester (a) Esterification

Firstly, a slurry of terephthalic acid, ethylene glycol and 2-ethyl-2-methyl-1,3-propanediol with a molar ratio 1:1.2:0.03 is concocted and properly mixed with antimony trioxide, titanium dioxide and triphenyl phosphate, then the esterification is carried out in the nitrogen atmosphere under the atmospheric pressure and the temperature of 250° C. The end point of esterification is chosen as the moment when the elimination of water reach 90% of the theoretical value. The additive contents (mass percentages relative to terephthalic acid) of antimony trioxide, titanium dioxide and triphenyl phosphate are 0.01%, 0.20% and 0.05%, respectively. Wherein the formula of branched diol is

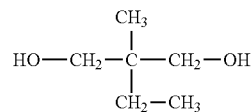

(b) Polycondensation

After the esterification hereinabove, the polycondensation is performed at negative pressure to obtain modified polyester eventually, which includes two successive stages, i.e., a) coarse vacuum stage, wherein the absolute pressure is smoothly reduced from the atmospheric pressure to 500 Pa within 30 min, and the reaction temperature is 260° C. while reaction time is 40 min, b) fine vacuum stage, wherein the pressure is furtherly reduced to 100 Pa, and the reaction temperature is 275° C. while reaction time is 70 min. The obtained modified polyester possesses a molecular chain structure composed of terephthalic acid segments, ethylene glycol segments and 2-ethyl-2-methyl-1,3-propanediol segments (whose molar content is 3% respect to that of terephthalic acid segments), a cyclic oligomer content of 0.6 Wt %, a number average molecular weight of 20000 and a molecular weight distribution index of 2.0.

(2) The one-step spun composite DTY is prepared from those two types of modified polyester with different viscosities mentioned above through the steps of melting, melt metering, composite extruding, cooling, oiling, drawing, heat setting and winding, and the spinning parameters in those technology steps are listed in Table 1. Wherein the intrinsic viscosity ratio of those two modified polyester is 0.55:1.05 and the value of higher one is 1.00 dL/g, whereas the weight content ratio of two modified polyester is 0.7:0.8.

The final obtained one-step spun composite DTY has an elastic shrinkage rate of 35%, a fineness of 150 detx, a linear density CV of 0.96%, a breaking strength of 2.5 cN/dtex, a breaking elongation of 33.2%, a breaking strength CV of 4.8%, a breaking elongation CV of 9.6%, a boiling water shrinkage of 9.0%.

Example 2

A method for preparing the one-step spun composite DTY, comprising the technological process of:

(1) Preparation of Modified Polyester (a) Esterification

Firstly, a slurry of terephthalic acid, ethylene glycol and 2,2-diethyl-1,3-propanediol with a molar ratio 1:1.3:0.04 is concocted and properly mixed with antimony glycol, titanium dioxide and trimethyl phosphate, then the esterification is carried out in the nitrogen atmosphere under the atmospheric pressure and the temperature of 260° C. The end point of esterification is chosen as the moment when the elimination of water reach 91% of the theoretical value. The additive contents (mass percentages relative to terephthalic acid) of antimony glycol, titanium dioxide and trimethyl phosphate are 0.02%, 0.21% and 0.03%, respectively. Wherein the formula of branched diol is

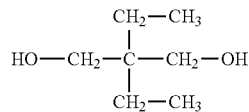

(b) Polycondensation

After the esterification hereinabove, the polycondensation is performed at negative pressure to obtain modified polyester eventually, which includes two successive stages, i.e., a) coarse vacuum stage, wherein the absolute pressure is smoothly reduced from the atmospheric pressure to 490 Pa within 35 min, and the reaction temperature is 261° C. while reaction time is 30 min, b) fine vacuum stage, wherein the pressure is furtherly reduced to 100 Pa, and the reaction temperature is 277° C. while reaction time is 85 min. The obtained modified polyester possesses a molecular chain structure composed of terephthalic acid segments, ethylene glycol segments and 2,2-diethyl-1,3-propanediol segments (whose molar content is 5% respect to that of terephthalic acid segments), a cyclic oligomer content of 0.6 Wt %, a number average molecular weight of 27000 and a molecular weight distribution index of 1.8.

(2) The one-step spun composite DTY is prepared from those two types of modified polyester with different viscosities mentioned above through the steps of melting, melt metering, composite extruding, cooling, oiling, drawing, heat setting and winding, and the spinning parameters in those technology steps are listed in Table 1. Wherein the intrinsic viscosity ratio of those two modified polyester is 0.60:1.00 and the value of higher one is 1.05 dL/g, whereas the weight content ratio of two modified polyester is 0.8:0.7.

The final obtained one-step spun composite DTY has an elastic shrinkage rate of 38%, a fineness of 190 detx, a linear density CV of 0.96%, a breaking strength of 2.4 cN/dtex, a breaking elongation of 37.2%, a breaking strength CV of 4.3%, a breaking elongation CV of 9.9%, a boiling water shrinkage of 9.0%.

Example 3

A method for preparing the one-step spun composite DTY, comprising the technological process of:

(1) Preparation of Modified Polyester (a) Esterification

Firstly, a slurry of terephthalic acid, ethylene glycol and 2-butyl-2-ethyl-1,3-propanediol with a molar ratio 1:1.4: 0.05 is concocted and properly mixed with antimony acetate, titanium dioxide and trimethyl phosphite, then the esterification is carried out in the nitrogen atmosphere under the pressure of 0.1 MPa and the temperature of 252° C. The end point of esterification is chosen as the moment when the elimination of water reach 92% of the theoretical value. The additive contents (mass percentages relative to terephthalic acid) of antimony acetate, titanium dioxide and trimethyl phosphite are 0.03%, 0.23% and 0.01%, respectively. Wherein the formula of branched diol is

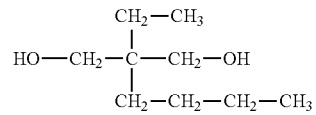

(b) Polycondensation

After the esterification hereinabove, the polycondensation is performed at negative pressure to obtain modified polyester eventually, which includes two successive stages, i.e., a) coarse vacuum stage, wherein the absolute pressure is smoothly reduced from the normal value to 495 Pa within 40 min, and the reaction temperature is 263° C. while reaction time is 45 min, b) fine vacuum stage, wherein the pressure is furtherly reduced to 95 Pa, and the reaction temperature is 278° C. while reaction time is 60 min. The obtained modified polyester possesses a molecular chain structure composed of terephthalic acid segments, ethylene glycol segments and 2-butyl-2-ethyl-1,3-propanediol segments (whose molar content is 4% respect to that of terephthalic acid segments), a cyclic oligomer content of 0.5 Wt %, a number average molecular weight of 21000 and a molecular weight distribution index of 2.2.

(2) The one-step spun composite DTY is prepared from those two types of modified polyester with different viscosities mentioned above through the steps of melting, melt metering, composite extruding, cooling, oiling, drawing, heat setting and winding, and the spinning parameters in those technology steps are listed in Table 1. Wherein the intrinsic viscosity ratio of those two modified polyester is 0.65:1.10 and the value of higher one is 1.08 dL/g, whereas the weight content ratio of two modified polyester is 0.7:0.7.

The final obtained one-step spun composite DTY has an elastic shrinkage rate of 39%, a fineness of 210 detx, a linear density CV of 0.99%, a breaking strength of 2.2 cN/dtex, a breaking elongation of 41.2%, a breaking strength CV of 4.4%, a breaking elongation CV of 9.8%, a boiling water shrinkage of 9.5%.

Example 4

A method for preparing the one-step spun composite DTY, comprising the technological process of:

(1) Preparation of Modified Polyester (a) Synthesis of 3,3-diethyl-1,5-pentanediol At first 3,3-diethyl-propionaldehyde, acetaldehyde and triethylamine are reacted for 20 min under 90° C. in nitrogen atmosphere, then the concentrated solution is added into the hydrogenation reactor equipped with Raney nickel catalyst, and the reaction is furtherly carried out under 2.914 MPa of hydrogen pressure at 100° C. When the reaction is completed, the reaction system is cooled to separate the catalyst out, then the solution is treated with ion exchange resin, followed by the water vacuum distillation, the separation and the purification of branched diol. The obtained diol has a formula of

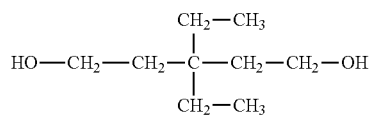

(b) Esterification

Firstly, a slurry of terephthalic acid, ethylene glycol and 3,3-diethyl-1,5-penpentadiol with a molar ratio 1:1.5:0.06 is concocted and properly mixed with antimony trioxide, titanium dioxide and triphenyl phosphate, then the esterification is carried out in the nitrogen atmosphere under the pressure of 0.3 MPa and the temperature of 255° C. The end point of esterification is chosen as the moment when the elimination of water reach 95% of the theoretical value. The additive contents (mass percentages relative to terephthalic acid) of antimony trioxide, titanium dioxide and triphenyl phosphate are 0.04%, 0.25% and 0.01%, respectively.

(c) Polycondensation

After the esterification hereinabove, the polycondensation is performed at negative pressure to obtain modified polyester eventually, which includes two successive stages, i.e., a) coarse vacuum stage, wherein the absolute pressure is smoothly reduced from the normal value to 400 Pa within 50 min, and the reaction temperature is 265° C. while reaction time is 33 min, b) fine vacuum stage, wherein the pressure is furtherly reduced to 90 Pa, and the reaction temperature is 280° C. while reaction time is 50 min. The obtained modified polyester possesses a molecular chain structure composed of terephthalic acid segments, ethylene glycol segments and 3,3-diethyl-1,5-penpentadiol segments (whose molar content is 3.5% respect to that of terephthalic acid segments), a cyclic oligomer content of 0.2 wt %, a number average molecular weight of 23000 and a molecular weight distribution index of 1.9.

(2) The one-step spun composite DTY is prepared from those two types of modified polyester with different viscosities mentioned above through the steps of melting, melt metering, composite extruding, cooling, oiling, drawing, heat setting and winding, and the spinning parameters in those technology steps are listed in Table 1. Wherein the intrinsic viscosity ratio of those two modified polyester is 0.65:1.05 and the value of higher one is 1.13 dL/g, whereas the weight content ratio of two modified polyester is 0.9:0.7.

The final obtained one-step spun composite DTY has an elastic shrinkage rate of 36%, a fineness of 250 detx, a linear density CV of 0.91%, a breaking strength of 2.8 cN/dtex, a breaking elongation of 40.0%, a breaking strength CV of 4.1%, a breaking elongation CV of 9.7%, a boiling water shrinkage of 9.4%.

Example 5

A method for preparing the one-step spun composite DTY, comprising the technological process of:

(1) Preparation of Modified Polyester (a) Synthesis of 4,4-diethyl-1,7-heptanediol At first 4,4-diethyl-butyraldehyde, propylaldehyde and triethylamine are reacted for 20 min under 92° C. in nitrogen atmosphere, then the concentrated solution is added into the hydrogenation reactor equipped with Raney nickel catalyst, and the reaction is furtherly carried out under 2.914 MPa of hydrogen pressure at 100° C. When the reaction is completed, the reaction system is cooled to separate the catalyst out, then the solution is treated with ion exchange resin, followed by the water vacuum distillation, the separation and the purification of branched diol. The obtained diol has a formula of

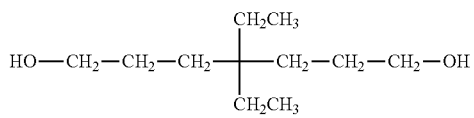 [SMILES: CCC(CC)(CCCO)CCCO]

(b) Esterification

Firstly, a slurry of terephthalic acid, ethylene glycol and 4,4-diethyl-1,7-heptanediol with a molar ratio 1:1.6:0.03 is concocted and properly mixed with antimony glycol, titanium dioxide and trimethyl phosphate, then the esterification is carried out in the nitrogen atmosphere under the atmospheric pressure and the temperature of 257° C. The end point of esterification is chosen as the moment when the elimination of water reach 92% of the theoretical value. The additive contents (mass percentages relative to terephthalic acid) of antimony glycol, titanium dioxide and trimethyl phosphate are 0.05%, 0.20% and 0.04%, respectively.

(c) Polycondensation

After the esterification hereinabove, the polycondensation is performed at negative pressure to obtain modified polyester eventually, which includes two successive stages, i.e., a) coarse vacuum stage, wherein the absolute pressure is smoothly reduced from the atmospheric pressure to 450 Pa within 33 min, and the reaction temperature is 270° C. while reaction time is 30 min, b) fine vacuum stage, wherein the pressure is furtherly reduced to 95 Pa, and the reaction temperature is 275° C. while reaction time is 60 min. The obtained modified polyester possesses a molecular chain structure composed of terephthalic acid segments, ethylene glycol segments and 4,4-diethyl-1,7-heptanediol segments (whose molar content is 5% respect to that of terephthalic acid segments), a cyclic oligomer content of 0.5 wt %, a number average molecular weight of 25000 and a molecular weight distribution index of 2.1.

(2) The one-step spun composite DTY is prepared from those two types of modified polyester with different viscosities mentioned above through the steps of melting, melt metering, composite extruding, cooling, oiling, drawing, heat setting and winding, and the spinning parameters in those technology steps are listed in Table 1. Wherein the intrinsic viscosity ratio of those two modified polyester is 0.70:1.20 and the value of higher one is 1.18 dL/g, whereas the weight content ratio of two modified polyester is 0.9:1.0.

The final obtained one-step spun composite DTY has an elastic shrinkage rate of 39%, a fineness of 280 detx, a linear density CV of 0.93%, a breaking strength of 3.0 cN/dtex, a breaking elongation of 38.2%, a breaking strength CV of 4.9%, a breaking elongation CV of 9.6%, a boiling water shrinkage of 9.9%.

Example 6

A method for preparing the one-step spun composite DTY, comprising the technological process of:

(1) Preparation of Modified Polyester (a) Synthesis of 4,4-bis(1-methyl ethyl)-1,7-heptanediol At first 4,4-bis(1-methylethyl)-butyraldehyde, propylaldehyde and triethylamine are reacted for 20 min under 95° C. in nitrogen atmosphere, then the concentrated solution is added into the hydrogenation reactor equipped with Raney nickel catalyst, and the reaction is furtherly carried out under 2.914 MPa of hydrogen pressure at 100° C. When the reaction is completed, the reaction system is cooled to separate the catalyst out, then the solution is treated with ion exchange resin, followed by the water vacuum distillation, the separation and the purification of branched diol. The obtained diol has a formula of

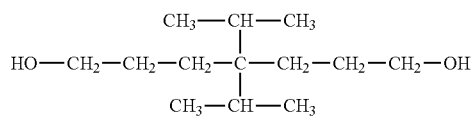

(b) Esterification

Firstly, a slurry of terephthalic acid, ethylene glycol and 4,4-bis(1-methyl ethyl)-1,7-heptanediol with a molar ratio 1:1.7:0.05 is concocted and properly mixed with antimony acetate, titanium dioxide and trimethyl phosphite, then the esterification is carried out in the nitrogen atmosphere under the pressure of 0.2 MPa and the temperature of 253° C. The end point of esterification is chosen as the moment when the elimination of water reach 96% of the theoretical value. The additive contents (mass percentages relative to terephthalic acid) of antimony acetate, titanium dioxide and trimethyl phosphite are 0.01%, 0.20% and 0.05%, respectively.

(c) Polycondensation

After the esterification hereinabove, the polycondensation is performed at negative pressure to obtain modified polyester eventually, which includes two successive stages, i.e., a) coarse vacuum stage, wherein the absolute pressure is smoothly reduced from the atmospheric pressure to 480 Pa within 38 min, and the reaction temperature is 262° C. while reaction time is 38 min, b) fine vacuum stage, wherein the pressure is furtherly reduced to 98 Pa, and the reaction temperature is 279° C. while reaction time is 80 min. The obtained modified polyester possesses a molecular chain structure composed of terephthalic acid segments, ethylene glycol segments and 4,4-bis(1-methyl ethyl)-1,7-heptanediol segments (whose molar content is 4% respect to that of terephthalic acid segments), a cyclic oligomer content of 0.55 wt %, a number average molecular weight of 27000 and a molecular weight distribution index of 2.2.

(2) The one-step spun composite DTY is prepared from those two types of modified polyester with different viscosities mentioned above through the steps of melting, melt metering, composite extruding, cooling, oiling, drawing, heat setting and winding, and the spinning parameters in those technology steps are listed in Table 1. Wherein the intrinsic viscosity ratio of those two modified polyester is 0.75:1.20 and the value of higher one is 1.19 dL/g, whereas the weight content ratio of two modified polyester is 1.0:0.7.

The final obtained one-step spun composite DTY has an elastic shrinkage rate of 41%, a fineness of 300 detx, a linear density CV of 0.94%, a breaking strength of 2.5 cN/dtex, a breaking elongation of 34.2%, a breaking strength CV of 4.7%, a breaking elongation CV of 9.7%, a boiling water shrinkage of 9.4%.

Example 7

A method for preparing the one-step spun composite DTY, comprising the technological process of:

(1) Preparation of Modified Polyester (a) Synthesis of 3,3-dipropyl-1,5-pentanediol At first 3,3-dipropyl-propionaldehyde, acetaldehyde and triethylamine are reacted for 20 min under 94° C. in nitrogen atmosphere, then the concentrated solution is added into the hydrogenation reactor equipped with Raney nickel catalyst, and the reaction is furtherly carried out under 2.914 MPa of hydrogen pressure at 100° C. When the reaction is completed, the reaction system is cooled to separate the catalyst out, then the solution is treated with ion exchange resin, followed by the water vacuum distillation, the separation and the purification of branched diol. The obtained diol has a formula of

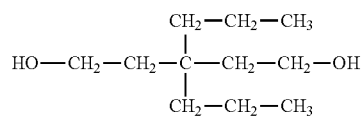

(b) Esterification

Firstly, a slurry of terephthalic acid, ethylene glycol and 3,3-dipropyl-1,5-pentanediol with a molar ratio 1:1.8:0.03 is concocted and properly mixed with antimony trioxide, titanium dioxide and triphenyl phosphate, then the esterification is carried out in the nitrogen atmosphere under the pressure of 0.3 MPa and the temperature of 250° C. The end point of esterification is chosen as the moment when the elimination of water reach 90% of the theoretical value. The additive contents (mass percentages relative to terephthalic acid) of antimony trioxide, titanium dioxide and triphenyl phosphate are 0.03%, 0.24% and 0.02%, respectively.

(c) Polycondensation

After the esterification hereinabove, the polycondensation is performed at negative pressure to obtain modified polyester eventually, which includes two successive stages, i.e., a) coarse vacuum stage, wherein the absolute pressure is smoothly reduced from the atmospheric pressure to 455 Pa within 42 min, and the reaction temperature is 264° C. while reaction time is 45 min, b) fine vacuum stage, wherein the pressure is furtherly reduced to 85 Pa, and the reaction temperature is 285° C. while reaction time is 75 min. The obtained modified polyester possesses a molecular chain structure composed of terephthalic acid segments, ethylene glycol segments and 3,3-dipropyl-1,5-pentanediol segments (whose molar content is 4.5% respect to that of terephthalic acid segments), a cyclic oligomer content of 0.45 wt %, a number average molecular weight of 26500 and a molecular weight distribution index of 2.2.

(2) The one-step spun composite DTY is prepared from those two types of modified polyester with different viscosities mentioned above through the steps of melting, melt metering, composite extruding, cooling, oiling, drawing, heat setting and winding, and the spinning parameters in those technology steps are listed in Table 1. Wherein the intrinsic viscosity ratio of those two modified polyester is 0.55:1.10 and the value of higher one is 1.00 dL/g, whereas the weight content ratio of two modified polyester is 1.0:0.9

The final obtained one-step spun composite DTY has an elastic shrinkage rate of 43%, a fineness of 290 detx, a linear density CV of 0.99%, a breaking strength of 2.7 cN/dtex, a breaking elongation of 37.2%, a breaking strength CV of 5.0%, a breaking elongation CV of 9.6%, a boiling water shrinkage of 10.0%.

Example 8

A method for preparing the one-step spun composite DTY, comprising the technological process of:

(1) Preparation of Modified Polyester (a) Synthesis of 4,4-dipropyl-1,7-heptanediol At first 4,4-dipropyl-butyraldehyde, acetaldehyde and triethylamine are reacted for 20 min under 92° C. in nitrogen atmosphere, then the concentrated solution is added into the hydrogenation reactor equipped with Raney nickel catalyst, and the reaction is furtherly carried out under 2.914 MPa of hydrogen pressure at 100° C. When the reaction is completed, the reaction system is cooled to separate the catalyst out, then the solution is treated with ion exchange resin, followed by the water vacuum distillation, the separation and the purification of branched diol. The obtained diol has a formula of

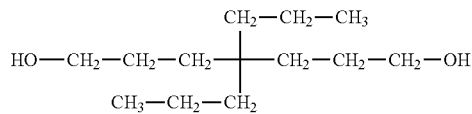

(b) Esterification

Firstly, a slurry of terephthalic acid, ethylene glycol and 4,4-dipropyl-1,7-heptanediol with a molar ratio 1:1.9:0.04 is concocted and properly mixed with antimony glycol, titanium dioxide and trimethyl phosphate, then the esterification is carried out in the nitrogen atmosphere under the pressure of 0.3 MPa and the temperature of 260° C. The end point of esterification is chosen as the moment when the elimination of water reach 93% of the theoretical value. The additive contents (mass percentages relative to terephthalic acid) of antimony glycol, titanium dioxide and trimethyl phosphate are 0.04%, 0.21% and 0.03%, respectively.

(c) Polycondensation

After the esterification hereinabove, the polycondensation is performed at negative pressure to obtain modified polyester eventually, which includes two successive stages, i.e., a) coarse vacuum stage, wherein the absolute pressure is smoothly reduced from the atmospheric pressure to 475 Pa within 45 min, and the reaction temperature is 265° C. while reaction time is 48 min, b) fine vacuum stage, wherein the pressure is furtherly reduced to 88 Pa, and the reaction temperature is 283° C. while reaction time is 80 min. The obtained modified polyester possesses a molecular chain structure composed of terephthalic acid segments, ethylene glycol segments and 4,4-dipropyl-1,7-heptanediol segments (whose molar content is 3% respect to that of terephthalic acid segments), a cyclic oligomer content of 0.6 wt %, a number average molecular weight of 23000 and a molecular weight distribution index of 2.0.

(2) The one-step spun composite DTY is prepared from those two types of modified polyester with different viscosities mentioned above through the steps of melting, melt metering, composite extruding, cooling, oiling, drawing, heat setting and winding, and the spinning parameters in those technology steps are listed in Table 1. Wherein the intrinsic viscosity ratio of those two modified polyester is 0.65:1.15 and the value of higher one is 1.08 dL/g, whereas the weight content ratio of two modified polyester is 0.8:0.7

The final obtained one-step spun composite DTY has an elastic shrinkage rate of 35%, a fineness of 260 detx, a linear density CV of 1.00%, a breaking strength of 2.7 cN/dtex, a breaking elongation of 37.2%, a breaking strength CV of 5.0%, a breaking elongation CV of 10.0%, a boiling water shrinkage of 10.0%.

Example 9

A method for preparing the one-step spun composite DTY, comprising the technological process of:

(1) Preparation of Modified Polyester (a) Synthesis of 4-methyl-4-(1,1-dimethyl ethyl)-1,7-heptanediol At first 4-methyl-4-(1,1-dimethylethyl)-butyraldehyde, propylaldehyde and triethylamine are reacted for 20 min under 92° C. in nitrogen atmosphere, then the concentrated solution is added into the hydrogenation reactor equipped with Raney nickel catalyst, and the reaction is furtherly carried out under 2.914 MPa of hydrogen pressure at 100° C. When the reaction is completed, the reaction system is cooled to separate the catalyst out, then the solution is treated with ion exchange resin, followed by the water vacuum distillation, the separation and the purification of branched diol. The obtained diol has a formula of

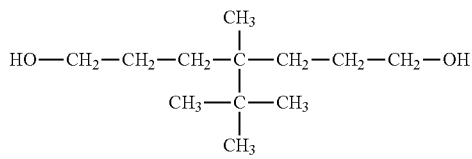

(b) Esterification

Firstly, a slurry of terephthalic acid, ethylene glycol and 4-methyl-4-(1,1-dimethyl ethyl)-1,7-heptanediol with a molar ratio 1:2.0:0.05 is concocted and properly mixed with antimony acetate, titanium dioxide and trimethyl phosphate, then the esterification is carried out in the nitrogen atmosphere under the atmospheric pressure and the temperature of 251° C. The end point of esterification is chosen as the moment when the elimination of water reach 96% of the theoretical value. The additive contents (mass percentages relative to terephthalic acid) of antimony acetate, titanium dioxide and trimethyl phosphate are 0.05%, 0.22% and 0.04%, respectively.

(c) Polycondensation

After the esterification hereinabove, the polycondensation is performed at negative pressure to obtain modified polyester eventually, which includes two successive stages, i.e., a) coarse vacuum stage, wherein the absolute pressure is smoothly reduced from the atmospheric pressure to 420 Pa within 30 min, and the reaction temperature is 267° C. while reaction time is 50 min, b) fine vacuum stage, wherein the pressure is furtherly reduced to 80 Pa, and the reaction temperature is 280° C. while reaction time is 90 min. The obtained modified polyester possesses a molecular chain structure composed of terephthalic acid segments, ethylene glycol segments and 4-methyl-4-(1,1-dimethyl ethyl)-1,7-heptanediol segments (whose molar content is 4% respect to that of terephthalic acid segments), a cyclic oligomer content of 0.25 wt %, a number average molecular weight of 24000 and a molecular weight distribution index of 2.2.

(2) The one-step spun composite DTY is prepared from those two types of modified polyester with different viscosities mentioned above through the steps of melting, melt metering, composite extruding, cooling, oiling, drawing, heat setting and winding, and the spinning parameters in those technology steps are listed in Table 1. Wherein the intrinsic viscosity ratio of those two modified polyester is 0.65:1.20 and the value of higher one is 1.0 dL/g, whereas the weight content ratio of two modified polyester is 1.0:0.8.

The final obtained one-step spun composite DTY has an elastic shrinkage rate of 37%, a fineness of 240 detx, a linear density CV of 0.98%, a breaking strength of 2.9 cN/dtex, a breaking elongation of 33.2%, a breaking strength CV of 4.8%, a breaking elongation CV of 9.4%, a boiling water shrinkage of 9.5%.

Example 10

A method for preparing the one-step spun composite DTY, comprising the technological process of:

(1) Preparation of Modified Polyester (a) Synthesis of 3-methyl-3-amyl-1,6-hexanediol At first 3-methyl-3-amyl-propionaldehyde, propylaldehyde and triethylamine are reacted for 20 min under 90° C. in nitrogen atmosphere, then the concentrated solution is added into the hydrogenation reactor equipped with Raney nickel catalyst, and the reaction is furtherly carried out under 2.914 MPa of hydrogen pressure at 100° C. When the reaction is completed, the reaction system is cooled to separate the catalyst out, then the solution is treated with ion exchange resin, followed by the water vacuum distillation, the separation and the purification of branched diol. The obtained diol has a formula of

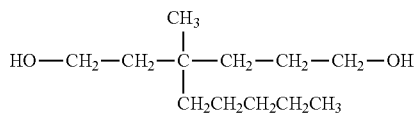

(b) Esterification

Firstly, a slurry of terephthalic acid, ethylene glycol and 3-methyl-3-amyl-1,6-hexanediol with a molar ratio 1:1.2:0.06 is concocted and properly mixed with antimony glycol, titanium dioxide and trimethyl phosphite, then the esterification is carried out in the nitrogen atmosphere under the pressure of 0.1 MPa and the temperature of 255° C. The end point of esterification is chosen as the moment when the elimination of water reach 92% of the theoretical value. The additive contents (mass percentages relative to terephthalic acid) of antimony glycol, titanium dioxide and trimethyl phosphite are 0.01%, 0.20% and 0.01%, respectively.

(c) Polycondensation

After the esterification hereinabove, the polycondensation is performed at negative pressure to obtain modified polyester eventually, which includes two successive stages, i.e., a) coarse vacuum stage, wherein the absolute pressure is smoothly reduced from the atmospheric pressure to 490 Pa within 50 min, and the reaction temperature is 269° C. while reaction time is 30 min, b) fine vacuum stage, wherein the pressure is furtherly reduced to 100 Pa, and the reaction temperature is 281° C. while reaction time is 55 min. The obtained modified polyester possesses a molecular chain structure composed of terephthalic acid segments, ethylene glycol segments and 3-methyl-3-amyl-1,6-hexanediol segments (whose molar content is 3.5% respect to that of terephthalic acid segments), a cyclic oligomer content of 0.1 wt %, a number average molecular weight of 20000 and a molecular weight distribution index of 1.9.

(2) The one-step spun composite DTY is prepared from those two types of modified polyester with different viscosities mentioned above through the steps of melting, melt metering, composite extruding, cooling, oiling, drawing, heat setting and winding, and the spinning parameters in those technology steps are listed in Table 1. Wherein the intrinsic viscosity ratio of those two modified polyester is 0.70:1.00 and the value of higher one is 1.20 dL/g, whereas the weight content ratio of two modified polyester is 0.9:1.0.

The final obtained one-step spun composite DTY has an elastic shrinkage rate of 36%, a fineness of 230 detx, a linear density CV of 0.97%, a breaking strength of 2.2 cN/dtex, a breaking elongation of 33.2%, a breaking strength CV of 4.8%, a breaking elongation CV of 9.0%, a boiling water shrinkage of 9.5%.

Example 11

A method for preparing the one-step spun composite DTY, comprising the technological process of:

(1) Preparation of Modified Polyester (a) Synthesis of 3,3-dipropyl-1,5-pentanediol At first 3,3-dipentyl-propionaldehyde, acetaldehyde and triethylamine are reacted for 20 min under 95° C. in nitrogen atmosphere, then the concentrated solution is added into the hydrogenation reactor equipped with Raney nickel catalyst, and the reaction is furtherly carried out under 2.914 MPa of hydrogen pressure at 100° C. When the reaction is completed, the reaction system is cooled to separate the catalyst out, then the solution is treated with ion exchange resin, followed by the water vacuum distillation, the separation and the purification of branched diol. The obtained diol has a formula of

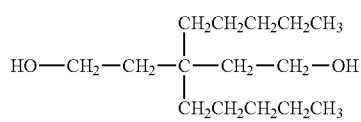

(b) Esterification

Firstly, a slurry of terephthalic acid, ethylene glycol and 3,3-dipropyl-1,5-pentanediol with a molar ratio 1:2.0:0.03 is concocted and properly mixed with antimony acetate, titanium dioxide and trimethyl phosphite, then the esterification is carried out in the nitrogen atmosphere under the pressure of 0.2 MPa and the temperature of 250° C. The end point of esterification is chosen as the moment when the elimination of water reach 97% of the theoretical value. The additive contents (mass percentages relative to terephthalic acid) of antimony acetate, titanium dioxide and trimethyl phosphite are 0.01%, 0.23% and 0.05%, respectively.

(c) Polycondensation

After the esterification hereinabove, the polycondensation is performed at negative pressure to obtain modified polyester eventually, which includes two successive stages, i.e., a) coarse vacuum stage, wherein the absolute pressure is smoothly reduced from the atmospheric pressure to 500 Pa within 45 min, and the reaction temperature is 260° C. while reaction time is 40 min, b) fine vacuum stage, wherein the pressure is furtherly reduced to 92 Pa, and the reaction temperature is 277° C. while reaction time is 80 min. The obtained modified polyester possesses a molecular chain structure composed of terephthalic acid segments, ethylene glycol segments and 3,3-dipropyl-1,5-pentanediol segments (whose molar content is 5% respect to that of terephthalic acid segments), a cyclic oligomer content of 0.35 wt %, a number average molecular weight of 25500 and a molecular weight distribution index of 1.8.

(2) The one-step spun composite DTY is prepared from those two types of modified polyester with different viscosities mentioned above through the steps of melting, melt metering, composite extruding, cooling, oiling, drawing, heat setting and winding, and the spinning parameters in those technology steps are listed in Table 1. Wherein the intrinsic viscosity ratio of those two modified polyester is 0.55:1.05 and the value of higher one is 1.20 dL/g, whereas the weight content ratio of two modified polyester is 0.7:0.8.

The final obtained one-step spun composite DTY has an elastic shrinkage rate of 38%, a fineness of 150 detx, a linear density CV of 1.00%, a breaking strength of 2.4 cN/dtex, a breaking elongation of 33.2%, a breaking strength CV of 5.0%, a breaking elongation CV of 9.2%, a boiling water shrinkage of 10.0%.

TABLE 1

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Spinning Temp. (° C.) | 285 | 283 | 281 | 280 | 290 | 285 | 288 | 290 | 281 | 283 | 286 |
| Cooling Temp. (° C.) | 20 | 21 | 25 | 25 | 21 | 20 | 20 | 21 | 24 | 23 | 22 |
| Interlacing Pres. (MPa) | 0.22 | 0.21 | 0.25 | 020 | 0.22 | 0.29 | 0.30 | 0.24 | 0.22 | 0.28 | 0.23 |
| Roller1 Speed (m/min) | 2200 | 2300 | 2500 | 2350 | 2550 | 2600 | 2580 | 2350 | 2280 | 2390 | 2470 |
| Roller1 Temp. (° C.) | 78 | 72 | 78 | 85 | 83 | 81 | 75 | 81 | 83 | 84 | 75 |
| Roller2 Speed (m/min) | 3650 | 3780 | 3790 | 3650 | 3800 | 3750 | 3710 | 3600 | 3850 | 3900 | 3730 |
| Roller2 Temp. (° C.) | 118 | 148 | 135 | 149 | 135 | 130 | 120 | 124 | 165 | 130 | 152 |
| Winding Speed (m/min) | 3580 | 3700 | 3750 | 3600 | 3700 | 3840 | 3760 | 3680 | 3720 | 3600 | 3790 |
| Initial Spinning Pack Pres. (bar) | 120 | 120 | 120 | 120 | 120 | 120 | 120 | 120 | 120 | 120 | 120 |
| Spinning Pack Pres. Rising ΔP (bar/day) | 0.58 | 0.56 | 0.6 | 0.55 | 0.52 | 0.6 | 0.54 | 0.55 | 0.52 | 0.54 | 0.59 |
| Spinning Pack Life Cycle (Day) | 66 | 62 | 63 | 60 | 60 | 65 | 67 | 62 | 61 | 60 | 68 |

What is claimed is:

1. A one-step spun composite draw texturing yarn (DTY), wherein a monofilament of the one-step spun composite DTY comprises a first modified polyester with a first viscosity and a second modified polyester with a second viscosity;

wherein the first modified polyester or the second modified polyester has a molecular chain structure comprising terephthalic acid segments, ethylene glycol segments and branched diol segments, and a branched diol of the branched diol segments has a structural formula of

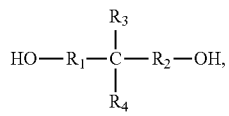

wherein each of $R_1$ and $R_2$ is selected from a linear alkylene with 1-3 carbon atoms, $R_3$ is selected from an alkyl with 1-5 carbon atoms, and $R_4$ is selected from an alkyl with 2-5 carbon atoms;

wherein the one-step spun composite DTY has an elastic shrinkage rate of greater than or equal to 35%.

2. The one-step spun composite DTY of claim 1, wherein a ratio of the second viscosity to the first viscosity is (0.55-0.70):(1.00-1.20), the first viscosity is higher than the second viscosity, and the first viscosity is 1.00-1.20 dL/g.

3. The one-step spun composite DTY of claim 2, wherein the one-step spun composite DTY has a fineness of 150-300 dtex, a linear density CV of less than or equal to 1.00, a breaking strength of greater than or equal to 2.2 cN/dtex, a breaking elongation of 37.2±4.0%, a breaking strength CV of less than or equal to 5.0%, a breaking elongation CV of less than or equal to 10.0% and a boiling water shrinkage rate of 9.5±0.5%.

4. The one-step spun composite DTY of claim 3, wherein a cyclic oligomer content in the first modified polyester or the second modified polyester is less than or equal to 0.6 wt %;
the first viscosity is higher than the second viscosity, the second modified polyester has a number average molecular weight of 17000-22000 and a molecular weight distribution index of 1.8-2.2;
the first modified polyester has a number average molecular weight of 25000-30000 and a molecular weight distribution index of 1.8-2.2;
a content of the branched diol segments in the first modified polyester or the second modified polyester is 3-5 mol % of the terephthalic acid segments;
the branched diol is selected from the group consisting of 2-ethyl-2-methyl-1,3-propanediol, 2,2-diethyl-1,3-propanediol, 2-butyl-2-ethyl-1,3-propanediol, 3,3-diethyl-1,5-penpentadiol, 4,4-diethyl-1,7-heptanediol, 4,4-bis (1-methyl ethyl)-1,7-heptanediol, 3,3-dipropyl-1,5-pentanediol, 4,4-dipropyl-1,7-heptanediol, 4-methyl-4-(1,1-dimethyl ethyl)-1,7-heptanediol, 3-methyl-3-amyl-1,6-hexanediol and 3,3-dipropyl-1,5-pentanediol.

5. The one-step spun composite DTY of claim 2, wherein a cyclic oligomer content in the first modified polyester or the second modified polyester is less than or equal to 0.6 wt %;
the first viscosity is higher than the second viscosity, the second modified polyester has a number average molecular weight of 17000-22000 and a molecular weight distribution index of 1.8-2.2;
the first modified polyester has a number average molecular weight of 25000-30000 and a molecular weight distribution index of 1.8-2.2;
a content of the branched diol segments in the first modified polyester or the second modified polyester is 3-5 mol % of the terephthalic acid segments;
the branched diol is selected from the group consisting of 2-ethyl-2-methyl-1,3-propanediol, 2,2-diethyl-1,3-propanediol, 2-butyl-2-ethyl-1,3-propanediol, 3,3-diethyl-1,5-penpentadiol, 4,4-diethyl-1,7-heptanediol, 4,4-bis (1-methyl ethyl)-1,7-heptanediol, 3,3-dipropyl-1,5-pentanediol, 4,4-dipropyl-1,7-heptanediol, 4-methyl-4-(1,1-dimethyl ethyl)-1,7-heptanediol, 3-methyl-3-amyl 1-1,6-hexanediol and 3,3-dipropyl-1,5-pentanediol.

6. The one-step spun composite DTY of claim 1, wherein a cyclic oligomer content in the first modified polyester or the second modified polyester is less than or equal to 0.6 wt %;
the first viscosity is higher than the second viscosity, the second modified polyester has a number average molecular weight of 17000-22000 and a molecular weight distribution index of 1.8-2.2;
the first modified polyester has a number average molecular weight of 25000-30000 and a molecular weight distribution index of 1.8-2.2;
a content of the branched diol segments in the first modified polyester or the second modified polyester is 3-5 mol % of the terephthalic acid segments;
the branched diol is selected from the group consisting of 2-ethyl-2-methyl-1,3-propanediol, 2,2-diethyl-1,3-propanediol, 2-butyl-2-ethyl-1,3-propanediol, 3,3-diethyl-1,5-penpentadiol, 4,4-diethyl-1,7-heptanediol, 4,4-bis (1-methyl ethyl)-1,7-heptanediol, 3,3-dipropyl-1,5-pentanediol, 4,4-dipropyl-1,7-heptanediol, 4-methyl-4-(1,1-dimethyl ethyl)-1,7-heptanediol, 3-methyl-3-amyl-1,6-hexanediol and 3,3-dipropyl-1,5-pentanediol.

7. The one-step spun composite DTY of claim 6, wherein the second modified polyester is prepared by performing an esterification reaction and a polycondensation reaction;

(1) the esterification reaction comprises:
mixing a terephthalic acid, an ethylene glycol and the branched diol to obtain a slurry;
adding a catalyst, an extinction agent and a stabilizer into the slurry to obtain a first mixture;
carrying out the esterification reaction on the first mixture under a pressure of nitrogen atmosphere to obtain a second mixture, wherein during the esterification reaction, the pressure ranges from an atmospheric pressure to 0.3 MPa, a reaction temperature is 250-260° C., and the esterification reaction ends when a water elimination amount in the esterification reaction reaches 90% of a theoretical value;

(2) the polycondensation reaction comprises:
after the esterification reaction ends, performing the polycondensation reaction on the second mixture under a negative pressure, the polycondensation reaction comprises a coarse vacuum stage and a fine vacuum stage, wherein during the coarse vacuum stage, a first pressure is smoothly reduced from a normal value to less than 500 Pa within 30-50 min, a first reaction temperature is 260-270° C., and a first reaction time is 30-50 min, during the fine vacuum stage, a second pressure is furtherly reduced to less than 100 Pa, a second reaction temperature is 275-285° C., and a second reaction time is 50-90 min;

after the polycondensation reaction ends, the second modified polyester is obtained, and the second modified polyester undergoes an extra solid state polycondensation to produce the first modified polyester.

8. The one-step spun composite DTY of claim 7, wherein a molar ration of the terephthalic acid, the ethylene glycol to the branched diol is 1:(1.2-2.0):(0.03-0.06), and an amount of the catalyst is 0.01-0.05% by weight of the terephthalic acid, an amount of the extinction agent is 0.20-0.25% by weight of the terephthalic acid and an amount of the stabilizer is 0.01-0.05% by weight of the terephthalic acid.

9. The one-step spun composite DTY of claim 8, wherein the catalyst is selected from the group consisting of antimony trioxide, antimony glycol and antimony acetate, the extinction agent is titanium dioxide, and the stabilizer is selected from the group consisting of triphenyl phosphate, trimethyl phosphate and trimethyl phosphite.

10. The one-step spun composite DTY of claim 7, wherein the catalyst is selected from the group consisting of antimony trioxide, antimony glycol and antimony acetate, the extinction agent is titanium dioxide, and the stabilizer is selected from the group consisting of triphenyl phosphate, trimethyl phosphate and trimethyl phosphite.

11. A method for preparing the one-step spun composite DTY of claim 1, comprising performing melting, melt metering, composite extruding, cooling, oiling, drawing, heat setting and winding on the first modified polyester and the second modified polyester.

12. The method of claim 11, wherein a weight ration of the first modified polyester to the second modified polyester is (0.7-1.0):(0.7-1.0).

13. The method of claim 12, wherein a plurality of spinning process parameters of the one-step spun composite DTY are as follows:
spinning temperature 280-290° C.;
cooling temperature 20-25° C.;
interlacing pressure 0.20-0.30 MPa;
speed of a first godet roller 2200-2600 m/min;
temperature of the first godet roller 75-85° C.;
speed of a second godet roller 3600-3900 m/min;
temperature of the second godet roller 135-165° C.;
winding speed 3580-3840 m/min;
initial spinning pack pressure 120 bar;
spinning pack pressure rising $\Delta P \leq 0.6$ bar/day; and
spinning pack life cycle $\geq 60$ days.

14. The method of claim 11, wherein a plurality of spinning process parameters of the one-step spun composite DTY are as follows:
spinning temperature 280-290° C.;
cooling temperature 20-25° C.;
interlacing pressure 0.20-0.30 MPa;
speed of a first godet roller 2200-2600 m/min;
temperature of the first godet roller 75-85° C.;
speed of a second godet roller 3600-3900 m/min;
temperature of the second godet roller 135-165° C.;
winding speed 3580-3840 m/min;
initial spinning pack pressure 120 bar;
spinning pack pressure rising $\Delta P \leq 0.6$ bar/day; and
spinning pack life cycle $\geq 60$ days.

15. The method of claim 11, wherein a ratio of the second viscosity to the first viscosity is (0.55-0.70):(1.00-1.20) the first viscosity is higher than the second viscosity, and the first viscosity is 1.00-1.20 dL/g.

16. The method of claim 15, wherein the one-step spun composite DTY has a fineness of 150-300 dtex, a linear density CV of less than or equal to 1.00, a breaking strength of greater than or equal to 2.2 cN/dtex, a breaking elongation of 37.2±4.0%, a breaking strength CV of less than or equal to 5.0%, a breaking elongation CV of less than or equal to 10.0% and a boiling water shrinkage rate of 9.5±0.5%.

17. The method of claim 11, wherein a cyclic oligomer content in the first modified polyester or the second modified polyester is less than or equal to 0.6 wt %;
the first viscosity is higher than the second viscosity, the second modified polyester has a number average molecular weight of 17000-22000 and a molecular weight distribution index of 1.8-2.2;
the first modified polyester has a number average molecular weight of 25000-30000 and a molecular weight distribution index of 1.8-2.2;
a content of the branched diol segments in the first modified polyester or the second modified polyester is 3-5 mol % of the terephthalic acid segments;
the branched diol is selected from the group consisting of 2-ethyl-2-methyl-1,3-propanediol, 2,2-diethyl-1,3-propanediol, 2-butyl-2-ethyl-1,3-propanediol, 3,3-diethyl-1,5-penpentadiol, 4,4-diethyl-1,7-heptanediol, 4,4-bis (1-methyl ethyl)-1,7-heptanediol, 3,3-dipropyl-1,5-pentanediol, 4,4-dipropyl-1,7-heptanediol, 4-methyl-4-(1,1-dimethyl ethyl)-1,7-heptanediol, 3-methyl-3-amyl-1,6-hexanediol and 3,3-dipropyl-1,5-pentanediol.

18. The method of claim 17, wherein the second modified polyester is prepared by performing an esterification reaction and a polycondensation reaction;
(1) the esterification reaction comprises:
mixing a terephthalic acid, an ethylene glycol and the branched diol to obtain a slurry;
adding a catalyst, an extinction agent and a stabilizer into the slurry to obtain a first mixture;
carrying out the esterification reaction on the first mixture under a pressure of nitrogen atmosphere to obtain a second mixture, wherein during the esterification reaction, the pressure ranges from an atmospheric pressure to 0.3 MPa, a reaction temperature is 250-260° C., and the esterification reaction ends when a water elimination amount in the esterification reaction reaches 90% of a theoretical value;
(2) the polycondensation reaction comprises:
after the esterification reaction ends, performing the polycondensation reaction on the second mixture under a negative pressure, the polycondensation reaction comprises a coarse vacuum stage and a fine vacuum stage, wherein during the coarse vacuum stage, a first pressure is smoothly reduced from a normal value to less than 500 Pa within 30-50 min, a first reaction temperature is 260-270° C., and a first reaction time is 30-50 min, during the fine vacuum stage, a second pressure is furtherly reduced to less than 100 Pa, a second reaction temperature is 275-285° C., and a second reaction time is 50-90 min;
after the polycondensation reaction ends, the second modified polyester is obtained, and the second modified polyester undergoes an extra solid state polycondensation to produce the first modified polyester.

19. The method of claim 18, wherein a molar ration of the terephthalic acid, the ethylene glycol to the branched diol is 1:(1.2-2.0):(0.03-0.06), and an amount of the catalyst is 0.01-0.05% by weight of the terephthalic acid, an amount of the extinction agent is 0.20-0.25% by weight of the terephthalic acid and an amount of the stabilizer is 0.01-0.05% by weight of the terephthalic acid.

20. The method of claim 18, wherein the catalyst is selected from the group consisting of antimony trioxide, antimony glycol and antimony acetate, the extinction agent is titanium dioxide, and the stabilizer is selected from the group consisting of triphenyl phosphate, trimethyl phosphate and trimethyl phosphite.

\* \* \* \* \*